March 3, 1936.  B. C. PHILLIPS  2,033,004
INTAKE CONTROL FOR INTERNAL COMBUSTION ENGINES
Filed Nov. 12, 1934   2 Sheets-Sheet 1
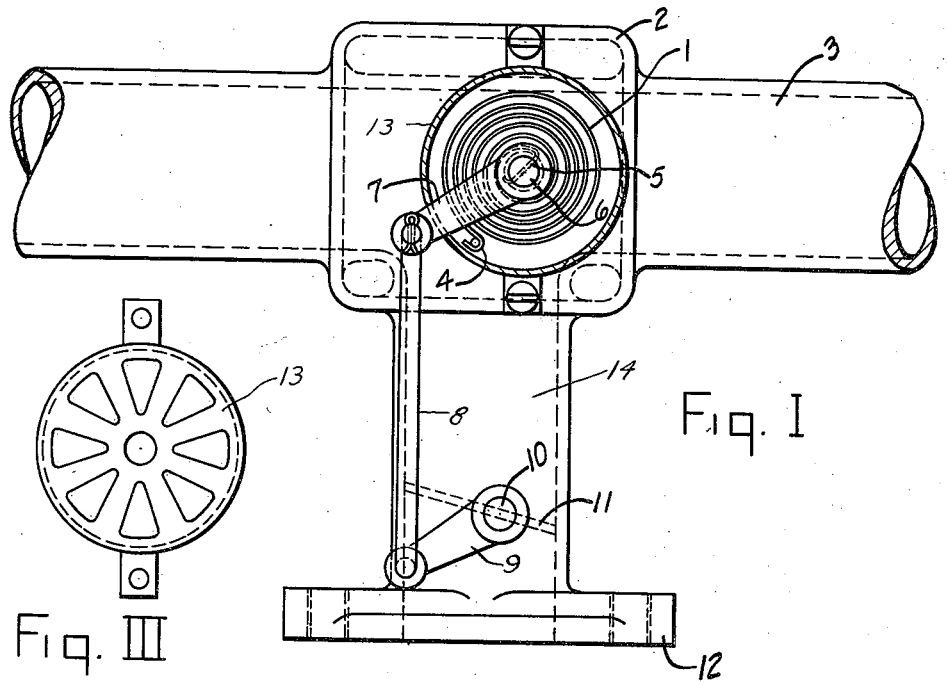
Fig. I
Fig. III
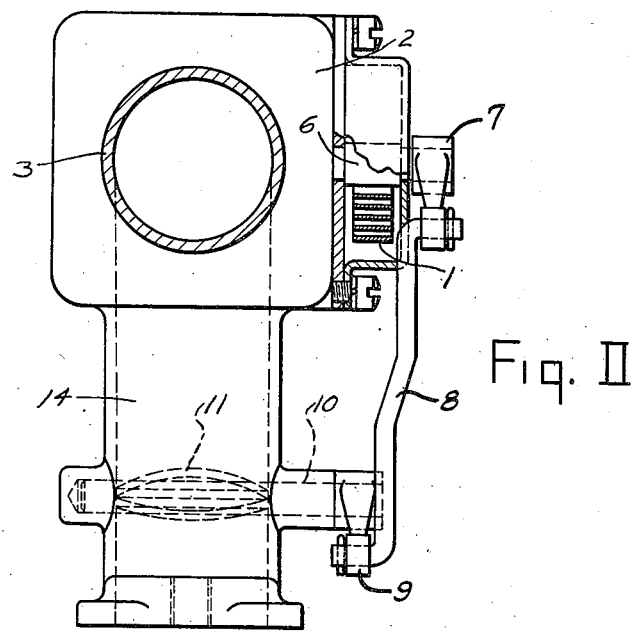
Fig. II
INVENTOR
Bernard C. Phillips
BY
E. N. Lovewell
ATTORNEY March 3, 1936.   B. C. PHILLIPS   2,033,004
INTAKE CONTROL FOR INTERNAL COMBUSTION ENGINES
Filed Nov. 12, 1934   2 Sheets-Sheet 2
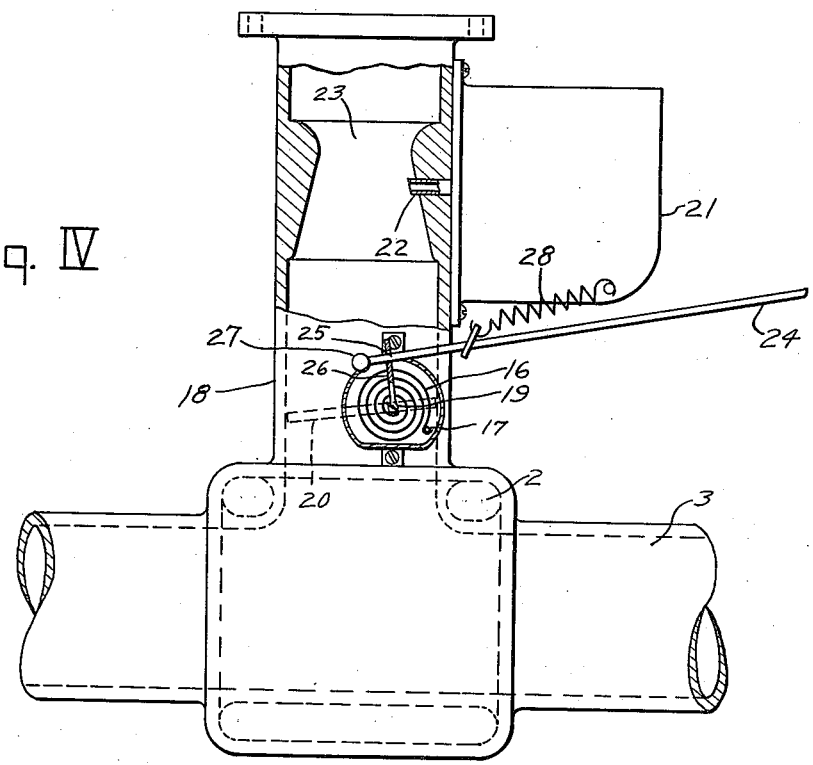
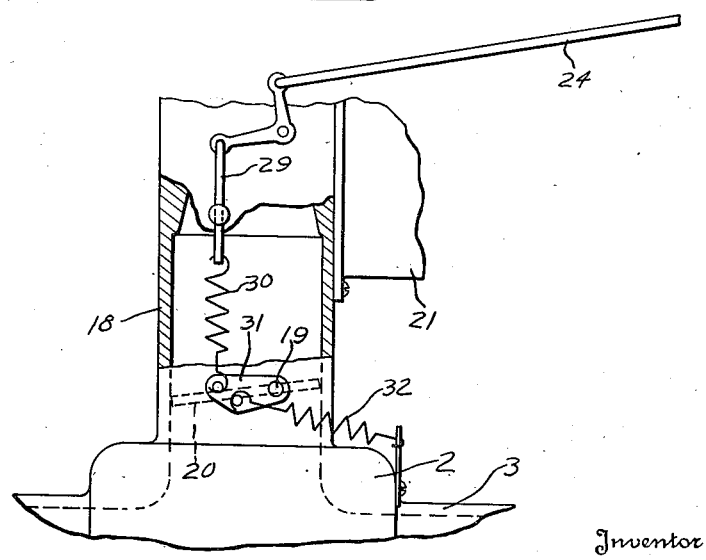

Patented Mar. 3, 1936

2,033,004

UNITED STATES PATENT OFFICE 2,033,004

INTAKE CONTROL FOR INTERNAL COMBUSTION ENGINES

Bernard C. Phillips, Detroit, Mich.

Application November 12, 1934, Serial No. 752,768

10 Claims. (Cl. 123—119)

This invention relates to the intake control for internal combustion engines, with the object of insuring a proper mixture for starting, especially if the engine is cold. Engines of this type have a well known tendency to operate poorly during the period between the initial firing and the time when a normal operating temperature is reached. The engine is often damaged considerably during this period because of poor lubrication and the carburetor mixture is much richer than normal.

Many provisions, both thermostatic and manual in design, have been applied to the carburetor in order to regulate the fuel mixture for better performance during the warming up period. While these methods have been moderately successful from an operating view point, they have the great disadvantage of fuel wastage, excess carbon monoxide and temporary destruction of engine lubrication.

It is a common observation by those familiar with motor cars that after starting a cold engine it will run moderately well under the condition of no load, but when an attempt is made to engage the clutch or to open the throttle, the engine starts to miss on one or more cylinders and may cease firing altogether. However, the engine may be caused to resume firing by nearly closing the throttle. The reason that the engine fires at no load is due to the high mixture velocity past the throttle and the high vacuum beyond the throttle which effectively vaporizes the fuel. When the throttle is opened, the mixture velocity past the throttle and the manifold vacuum are greatly reduced. In fact, so much so that practically all vaporization ceases in the liquid fuel of the mixture. Since the ratio of liquid fuel to air is about ten thousand to one by volume for a normal mixture, all semblance of distribution ceases and very little liquid fuel enters the cylinders in combustible form.

It is also well known that the carburetor mixture becomes only slightly leaner with temperature change, on an average about 5% for each 50°. Certainly, the mixture change traceable to the carburetor is not sufficient to prevent starting and fair operation even though the choke is not used and the engine temperature is near the freezing point of water.

Another fact easily observed is that internal combustion engines will start readily if the cylinders are primed by pouring a small amount of gasolene into them. We must, therefore, come to the conclusion that the difficulty in starting, and especially the poor operation during the warm-up period, is due to the failure of the cold intake manifold to properly deliver fuel to the cylinders. What I propose to do is to vaporize and pulverize the liquid fuel during the warm-up period by retaining an appreciable vacuum and by keeping the velocity of the mixture high as it passes a throttling member in the mixture passageway. In this manner, means other than heat will be used to form a combustible vapor in the intake manifold until sufficient exhaust heat is applied to the intake hot spot to vaporize the fuel.

The primary object of this invention, therefore, is to control the manifold vacuum in such a manner that it will always be positively maintained to a sufficient degree to vaporize the fuel during the warm-up period.

Aother object of this invention is to provide a supplemental throttle control that will be independent of the operator and will automatically adjust itself for the best performance.

A further object of this invention is to progressively decrease the range of the automatic vacuum control as the engine temperature increases to normal; whereupon the automatic control is no longer operative.

A still further object of this invention is to regulate the vacuum in the mixture passageway independently of the carburetor metering system.

The above and other objects of this invention will be more particularly explained in connection with the accompanying drawings, in which,—

Fig. I is a front elevation of the device as applied to an internal combustion engine, the thermostat housing being shown in section.

Fig. II is a side view of the control device partly in section.

Fig. III is a front elevation of the thermostat housing.

Fig. IV is a view partly in elevation and partly in section, showing a modified form of the invention.

Fig. V is a similar view showing another modification.

As shown in Figs. I, II and III, the invention is associated with an intake manifold 3 having an inlet passageway 14, at the lower end of which is a flange 12 for attaching a carburetor. An unbalanced valve 11 is mounted upon a spindle 10 within the passageway 14. A thermostat 1 is mounted within a housing 13 adjacent the hot spot 2 of the manifold 3. This thermostat, which may be of any well known type, is shown herein conventionally as a bimetal spiral spring strip with one end 4 secured to the wall of the manifold and the other end 5 secured to a shaft 6, which is free to turn. An arm 7 secured to the shaft 6 is connected by a link 8 to an arm 9, which is secured to the spindle 10.

The thermostat is so adjusted that, when the manifold is cold and the engine speed low, it will cause the valve 11 to yieldably close the passageway 14. If the engine speed is increased, the valve 11 will open in response to increased engine suction. If the throttle is opened wide and the engine speed is low, the valve 11 will be only slightly opened and there will be a substantial vacuum on the engine side of the valve. As the engine warms up, the tension of the thermostatic spring 1 is progressively relieved and finally, when the normal operating temperature is reached, the valve 11 is held wide open.

In the modification shown in Fig. IV, the unbalanced vacuum control valve 20 also serves as the throttle valve. One end of the thermostat 16 is secured at 17 to the wall of the down draft passageway 18 and its other end is secured to the stem 19 of the valve 20. Fuel is supplied from the carburetor 21 through the jet 22 to the venturi 23 above the valve 20. The throttle control rod 24, which has the usual connection with the accelerator, has a slidable connection at 25 with the arm 26, which is secured to the valve stem 19. A head 27 on the end of the rod 24 engages the arm 26 to move the valve 20 toward closed position, but when the throttle rod is moved in the opposite direction, it does not open the valve 20 but merely releases it so that it may be opened by suction from the engine. A spring 28 connected to the rod 24 closes the throttle whenever the accelerator is released.

With this construction, when the engine is cold and the rod 24 is advanced at low engine speed, the valve 20 gradually opens as the engine speed increases, always maintaining an appreciable vacuum in the mixture passageway. As the engine temperature becomes normal, the tension in the thermostatic spring decreases, thereby progressively relieving the vacuum in the manifold. Under normal operating temperature, the thermostat will hold the valve 20 open when the throttle rod 24 is advanced. However, the throttle return spring 28 is strong enough to return the valve to closed position, such as required for idling and is always capable of overcoming the opening effort of the thermostatic spring. This construction has the ultimate effect of the construction shown in Figs. I and II and has the added advantage of greater simplicity.

In the modification shown in Fig. V, the control is entirely manual. The control rod is connected through a reciprocable link 29 and tension spring 30 to an arm 31 secured to the valve stem 19. Another tension spring 32 connects the arm 31 to a fixed point on the manifold and tends to open the throttle valve 20, while the spring 30 tends to close it. The spring 30 is stronger than the spring 32 and in operation the net difference in tension determines the closing effort on the throttle valve. As the rod 24 is advanced to release the spring 32, the spring 30 begins to open the throttle. As the engine picks up speed, its suction acting upon the unbalanced valve opens it wider. It is to be noted that each of the springs 30 and 32 has the maximum leverage on the valve when it is the controlling force.

In Figs. I to IV, when the engine is cold, the valve 11 or 20 always remains closed until opened by suction from the engine. The resulting vacuum in the intake manifold insures the vaporization of the drops of liquid fuel as soon as they enter the manifold. When the engine is warmed up, the thermostat tends to open the valve. In Fig. V, the springs 30 and 32 are so tensioned that there is always a high vacuum in the intake manifold. This not only aids the vaporization of the fuel when the engine is cold but prevents the choking of the engine when it is running at low speed and the accelerator is suddenly depressed to wide open throttle position.

While I have shown and described in detail various embodiments of the invention, it will be understood that these are merely illustrative and that other modifications may be made within the scope of the invention as claimed.

I claim:

1. The combination with the fuel mixture passageway of an internal combustion engine, of an unbalanced valve therein adapted to be opened by suction of the engine, and thermostatic means offering yieldable resistance to such opening while the engine is cold.

2. The combination with the fuel mixture passageway of an internal combustion engine, of an unbalanced valve therein adapted to be opened by suction of the engine, and thermostatic means to progressively open the valve independently of the suction, as the temperature rises.

3. The combination with the fuel mixture passageway of an internal combustion engine, of an unbalanced valve therein adapted to be opened by suction of the engine, and a control rod operable in one direction to positively close the valve and in the other direction to release the valve for control by the engine suction.

4. The combination with the fuel mixture passageway of an internal combustion engine, of a valve therein, a thermostat tending to open the valve as the temperature rises, and manual control means to limit the opening movement of the valve but not its closing movement.

5. The combination with the fuel mixture passageway of an internal combustion engine, of an unbalanced valve therein adapted to be opened by the suction of the engine, and a thermostatic spring tending to open the valve independently of the engine suction, as the temperature rises.

6. The combination with the fuel mixture passageway of an internal combustion engine, of an unbalanced valve therein adapted to be opened by the suction of the engine, a thermostatic spring tending to open the valve independently of the engine suction as the temperature rises, and manual control means to limit the opening movement of the valve but not its closing movement.

7. The combination with the intake passageway of an internal combustion engine, of an unbalanced valve therein adapted to be opened by the suction of the engine, and opposed springs tending to move said valve in opposite directions, the spring tending to close the valve having greater initial tension than the other.

8. The combination with the intake passageway of an internal combustion engine, of an unbalanced valve therein adapted to be opened by the suction of the engine, two opposed springs tending to open and to close said valve respectively, the closing spring having greater initial tension than the other spring and manually controlled means to lessen the tension of the closing spring.

9. The combination with the intake passageway of an internal combustion engine, of an unbalanced valve therein adapted to be opened by the suction of the engine, two opposed springs tending to open and to close said valve respectively, the closing spring having greater initial tension than the other spring, and means to lessen the tension of the closing spring until it is overcome by the tension of the opening spring.

10. The combination as set forth in claim 9, in which each spring is so disposed that it acts on the valve with the greatest leverage when it is the controlling force.

BERNARD C. PHILLIPS.